United States Patent [19]

Pressman et al.

[11] 4,016,813
[45] Apr. 12, 1977

[54] ELECTROSTATIC LINE PRINTER

[75] Inventors: Gerald L. Pressman, San Jose, Calif.; John V. Casanova, Racine, Wis.

[73] Assignee: Electroprint, Inc., Cupertino, Calif.

[22] Filed: Jan. 21, 1975

[21] Appl. No.: 542,756

Related U.S. Application Data

[63] Continuation of Ser. No. 442,278, Feb. 13, 1974, abandoned, which is a continuation of Ser. No. 281,907, Aug. 18, 1972, abandoned, which is a continuation of Ser. No. 864,022, Oct. 6, 1969, Pat. No. 3,689,935.

[52] U.S. Cl. .............................. 101/426; 346/153; 250/325; 355/3 R; 355/16; 101/DIG. 13
[51] Int. Cl.$^2$ .................................. G01D 15/10
[58] Field of Search .................. 101/426, DIG. 13; 178/6.6 A; 346/1, 74 ES, 74 EB, 74 J; 355/3, 16, 11; 96/1 PE; 250/325

[56] References Cited

UNITED STATES PATENTS

| | | | |
|---|---|---|---|
| 3,205,302 | 9/1965 | Quade | 178/6.6 A |
| 3,220,324 | 11/1965 | Snelling | 355/16 |
| 3,228,326 | 1/1966 | Childress | 101/DIG. 13 |
| 3,266,046 | 8/1966 | Boyd | 346/74 ES |
| 3,277,818 | 10/1966 | Cone | 346/74 ES X |
| 3,543,022 | 11/1970 | Lennon | 250/325 |
| 3,625,604 | | Pressman | 101/DIG. 13 |
| 3,647,291 | 3/1972 | Pressman et al. | 355/3 |
| 3,665,856 | 5/1972 | Heller, Jr. | 101/DIG. 13 X |
| 3,673,598 | 6/1972 | Simm et al. | 250/325 X |
| 3,689,935 | 9/1972 | Pressman et al. | 101/DIG. 13 |
| 3,779,166 | 12/1973 | Pressman et al. | 101/426 |
| 3,797,926 | 3/1974 | Fotlawd et al. | 101/DIG. 13 |
| 3,824,010 | 7/1974 | Pressman | 101/DIG. 13 |

*Primary Examiner*—E. H. Eickholt
*Attorney, Agent, or Firm*—Townsend and Townsend

[57] ABSTRACT

An electrostatic line printing process employing multilayered particle modulator comprising a layer of insulating material on one side of the insulating layer and a segmented layer of conducting material on the other side of the insulating layer. At least one row of apertures is formed through the multilayered particle modulator. Each segment of the segmented layer of conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and transplated relative to the particle modulator to provide line-by-line scan printing.

22 Claims, 14 Drawing Figures

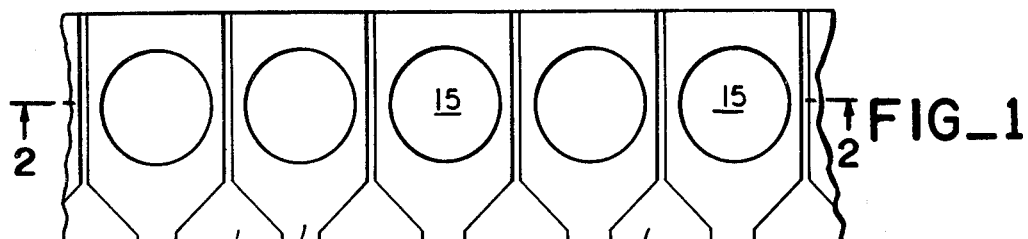
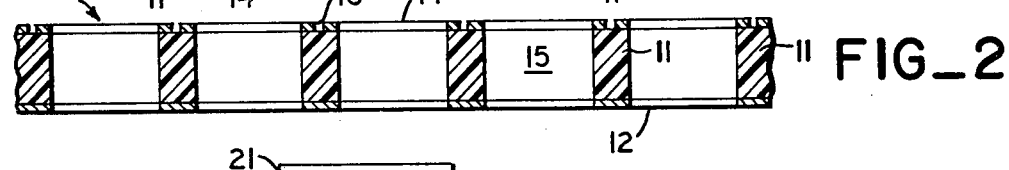
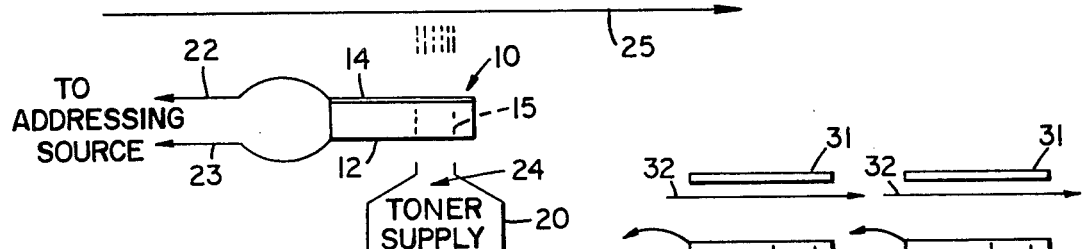
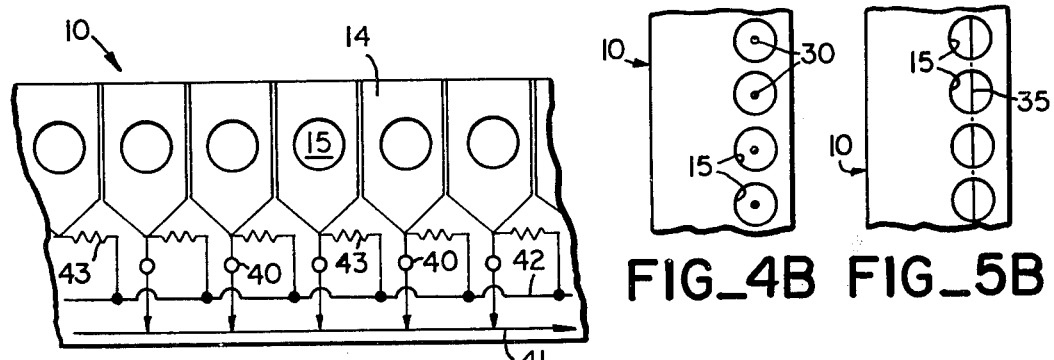
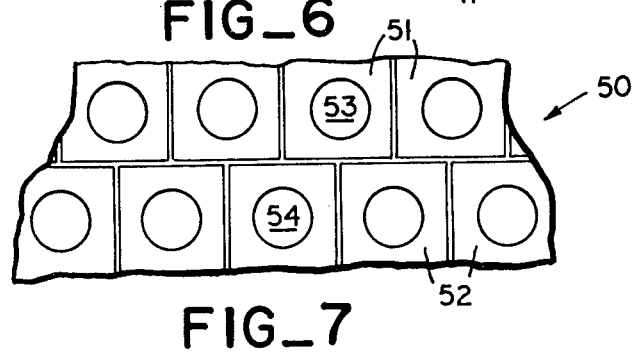

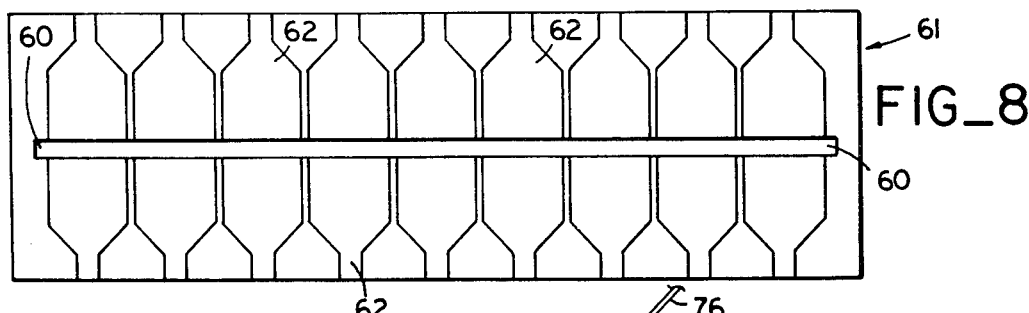
FIG_8
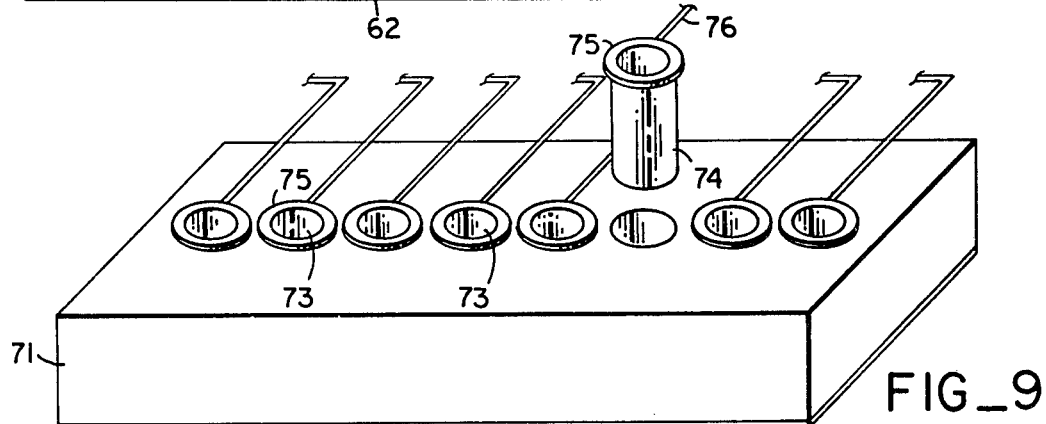
FIG_9
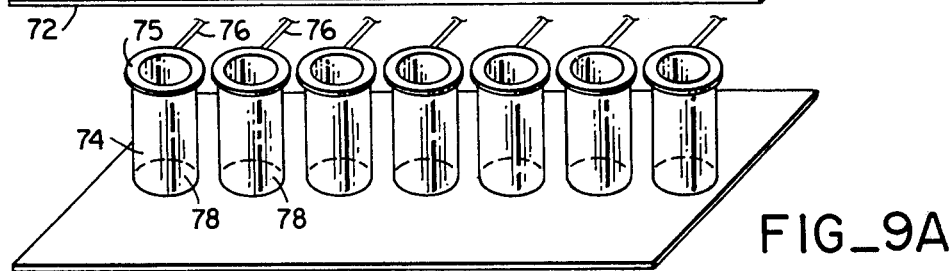
FIG_9A
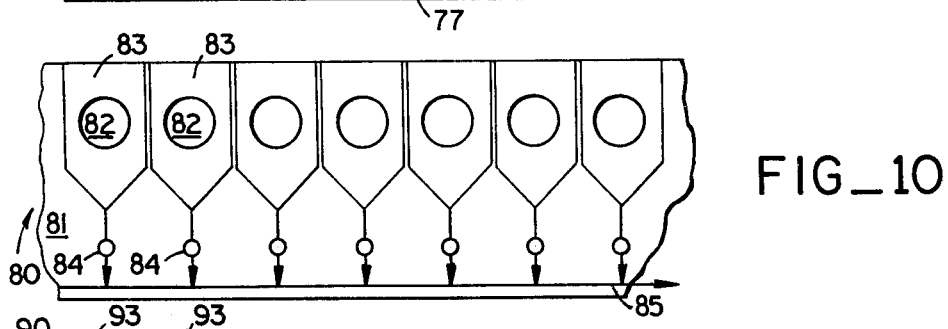
FIG_10
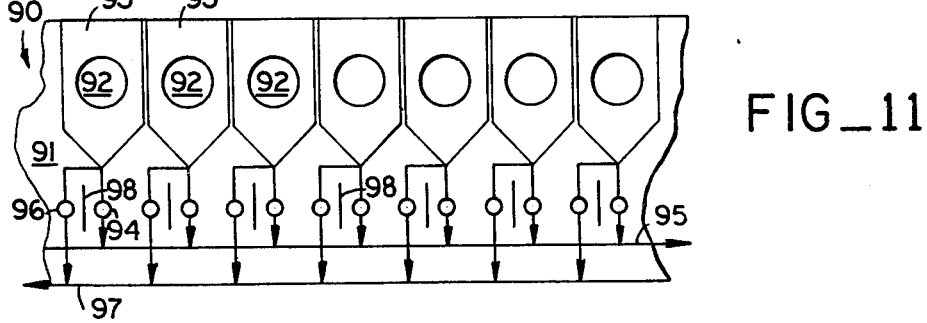
FIG_11

ELECTROSTATIC LINE PRINTER

This is a continuation of application Ser. No. 442,278, filed Feb. 13, 1974 and now abandoned, which in turn is a continuation of application Ser. No. 281,907, filed Aug. 18, 1972, and now abandoned, which in turn is a continuation of application Ser. No. 864,022, filed on Oct. 6, 1969, now U.S. Pat. No. 3,689,935.

This invention relates to a new and improved electrostatic line printer suitable for facsimile reproduction, copying printing, computer output, and similar applications.

It is an object of the present invention to provide a new and improved method of non-contact electrostatic line printing capable of producing continuous grey scale and capable of operating noiselessly at rates faster then mechanical printers.

Another object of the invention is to provide a non-contact electrostatic line printing process suitable not only for facsimile reproduction, copying, and printing, but also for computer readout and computer graphics.

In order to accomplish these results the present invention in its preferred embodiment contemplates providing a multilayered particle modulator comprising a layer of insulating material, a continuous layer of conductive material coated on one side of the insulating layer, and a segmented layer of conductive material coated on the other side of the insulating layer. Each segment of the segmented conductive layer is insulatively isolated from each other segment in the layer. At least one row of apertures is formed through the multilayered modulator so that a segment of the segmented conductive layer surrounds each aperture.

According to the invention, selected electrical potentials are applied to each of the segments of the segmented conductive layer according to the pattern of lines to be reproduced, while a fixed potential is applied to the continuous conductive layer. An overall electrical field is established between electrodes for projecting charged particles from a particle source through the apertures of the particle modulator and the density of the particle stream is modulated according to the pattern of potentials applied to the segments of the segmented conductive layer. A print-receiving medium is interposed in the modulated particle stream and translated relative to the particle modulator for continuous or sequential line-by-line or line scanning reproduction as a function of the potentials applied to the segments of the segmented conductive layer on the particle modulator.

According to one aspect of the invention, electric potentials are applied to each of the segments of the segmented conductive layer along a plurality of electrical lead wires connected respectively to the segments and controlled, for example, by logic circuitry for computer print-out or computer graphics.

According to another embodiment of the invention, each segment of the segmented conductive layer is connected by means of an electrical lead through a photoconductor element to ground potential, or to some other fixed potential. At the same time an electrical power supply is connected to each segment through a resistance. Thus, the electrical potential applied to each segment is a function of and proportional to the light falling on the photoconductor connected in the electrical circuit with the conductive segment. In this manner, an image to be reproduced can be scanned line-by-line along the row of photoconductors or, each of the apertures and corresponding photoconductors can be individually addressed by, for example, fiber optics. Such arrangements permit image intensity to be effective at one line or field of location and, simultaneously therewith, projection or printing may take place at a different location, even remote from the exposure or intensity determining station. This feature enables reduction or enlargement of printing areas compared to image areas.

The multilayered particle modulator contemplated by the present invention selectively regulates and modulates the flow of toner particles through the apertures by means of fringing blocking and enhancing electrical fields established within the apertures of the particle modulator. In this respect, the invention incorporates to its unique combination techniques disclosed in the electrostatic printing systems and methods set forth in U.S. Pat. application Ser. Nos. 673,499 and 776,146, assigned to the assignee of the present case. According to these disclosures there is provided a multilayered apertured screen including in at least certain embodiments a conductive layer and an insulative layer on which an electrostatic latent image is formed for modulating the flow of charged toner particles or other printing particles through the apertures of the screen. The screen, comprising preferably at least an insulative layer and a conductive layer, permits the development of a double layer charge on the opposite sides of the insulative layer for selectively producing fringing blocking and enhancing fields (negative through zero to positive) within the apertures of the screen. Thus, the double layer charge can be selectively developed to substantially completely block the passage of charged particles through certain apertures, enhance and accelerate the passage of charged particles through other apertures, and control the density of the particle stream through other apertures along a continuous range in between, thus providing a modulated flow of toner particles corresponding with the image to be reproduced. The modulated stream of toner particles or other charged particles is transferred by means of an overall applied electrostatic projection field across an air gap to a print-receiving medium. The image may thereafter be fixed according to known techniques.

The present invention differs from the subject matter of these patent applications in that an electrostatic latent image is not established on a screen. The present invention contemplates an electrostatic line printer in which selected fields are individually established within the apertures of one or more rows of apertures in a multilayered particle modulator as heretofore described. The invention thus contemplates sequential or continuous line-by-line printing or printing by line scanning utilizing selected potentials applied directly to conductive segments surrounding a row of apertures in the particle modulator. An electrostatic latent image is not formed on the modulator. Rather fringing blocking and enhancing fields within the apertures are established between the continuous conductive layer and the segmented conductive layer at each side of the apertures.

In operating the electrostatic line printer, selected potentials are applied to the segments surrounding the row of apertures in a pattern according to the lines to be printed. At the same time, the continuous conductive layer on the opposite side of the particle modulator is maintained at a substantially fixed potential. The consequent double layer charge establishes fringing fields within the apertures of the particle modulator. This double layer charge can be used to provide not only blocking fields at the apertures of the modulator but also enhancing fields to actively project particles through the aperture. By means of enhancing fields as well as blocking fields, the quality and control of continuous tone grey scale non-contact printing is increased. The enhancing field electrically enlarges the apertures beyond their physical dimension by funnelling particles through each aperture with an enhancing field in a stream which expands in cross section on the output side of the modulator. Enhancing fields are generated by establishing within an aperture, fields of direction and polarity opposite that of the fields within a blocking aperture. White to gray to black printing is therefore possible by varying the electrical potential applied to the conductive segments from negative to positive with respect to the fixed potential applied to the continuous conductive layer, and vice versa according to the charge of the particles. Positive or negative printing can be accomplished by reversing the applied voltages. An overall electrical field is applied between electrodes for propulsion of charged particles through the apertures of the particle modulator and the overall field is adjusted so that it is insufficient to overcome the fringing electrical fields established within apertures intended to completely block the flow of charged particles. In this respect, the thickness of the insulating layer and the diameter of the apertures are selected to provide a satisfactory thickness to diameter ratio to produce a substantially completely blocking field within the aperture. The conductive layers serve the additional purpose of shielding the fields established within apertures and tend to dissipate the charge of particles deposited on the conductor portion of the particle modulator.

A feature and advantage of the present invention is that continuous and sequential non-contact line printing can be accomplished by projecting ink particles such as toner particles or aerosols directly through the particle modulator onto a print receiving medium continuously translated relative to the particle modulator. Thus, printing on irregular surfaces is possible.

Another feature of the invention, however, is that instead of directly passing ink or toner particles through the particle modulator, a stream of charged particles such as ions can first be modulated by the apertures in accordance with the pattern to be reproduced for impingement upon the print receiving medium to establish an electrostatic latent image which can thereafter be dusted and developed according to known techniques. According to this aspect of the invention, a plurality of corona discharge points are aligned in a row with the apertures of the particle modulator, or, a corona wire can be aligned with the row of apertures to generate a stream of ions projected by an overall applied electrical field through the apertures for density modulation in accordance with a pattern to be reproduced. In this embodiment of the invention, the print receiving medium must include a dielectric or insulator layer capable of supporting the electrostatic latent image created by the modulated stream of ions. The image is then developed by dry or liquid electrostatic toner methods which are well known. An advantage of the use of ions for image formation rather than the direct use of ink particles is that it eliminates the problem of toner accumulation upon the particle modulator.

Other objects, features and advantages of the present invention will become apparent in the following specification and accompanying drawings.

BRIEF DESCRIPTION OF THE DRAWINGS:

FIG. 1 is a fragmentary plan view of a particle modulator embodying the present invention;

FIG. 2 is a side cross-sectional view in the direction of the arrows on line 2—2 of the particle modulator illustrated in FIG. 1;

FIG. 3 is a diagrammatic presentation of the electrostatic line printer;

FIG. 4A is a diagrammatic presentation of another electrostatic line printer utilizing corona discharge points;

FIG. 4B is a plan view of the particle modulator showing the position of the corona points;

FIG. 5A is a diagrammatic presentation of another electrostatic line printer utilizing a corona discharge wire;

FIG. 5B is a plan view of the particle modulator showing the positioning of the corona wire;

FIG. 6 is a diagrammatic plan view of an optionally addressable particle modulator for electrostatic line printing;

FIG. 7 is a diagrammatic plan view illustrating the layout of another particle modulator using parallel offset rows of apertures to provide full coverage;

FIG. 8 is a diagrammatic plan view of a particle modulator formed with an elongate slot.

FIGS. 9 and 9A are perspective views respectively of particle modulators using electrode rings or rims for controlling the stream of particles through a row of holes; and FIGS. 10 and 11 are diagrammatic views respectively of two different optically addressable particle modulators.

The multilayered particle modulator 10 illustrated in FIGS. 1 and 2 consists of a central insulative layer 11 made from a dielectric material such as plastic, ceramic, or glass. Coated on one side of the insulative layer 11 is a continuous conductive layer 12 consisting of a thin layer of metal or other good conductor. Coated on the opposite side of insulative layer 11 is a segmented conductive layer 14 consisting of a plurality of insulatively isolated conductive segments also referred to by the numeral 14. A row of apertures or holes 15 is formed through the multilayered modulator 10 and the apertures and conductive layer segments 14 are formed so that a conductive segment 14 surrounds each aperture 15. To reduce arcing between conductive segments, the dielectric material of the insulative layer can be projected between the segments, or a layer of insulating material can be formed over the entire segmented layer of conductive material lining the interstices 16 between segments.

For general application in facsimile reproduction, copying, printing and computer readout, a resolution of as low as fifty to seventy lines per inch thereby requiring fifty to seventy apertures per inch in the particle modulator may be acceptable. In forming a particle modulator of this resolution, the multi-layered screen can first be formed by lamination or deposition and the apertures thereafter mechanically drilled. For higher resolutions requiring as much as 500 to 1,000 lines per inch and greater, thin film etching techniques and laser burning techniques can be used in forming the multilayered apertured particle modulator. An aperture diameter in the range of 1 to 15 mils with a thickness for the insulative layer of approximately ½ to 2 times the aperture diameter has been found satisfactory. The thickness of the thin films is not critical. At these dimensions, a few hundred volts potential between the conductive layers is sufficient to establish the fringing blocking and enhancing fields necessary for modulating a flow of particles through the apertures. As a general rule, the larger the aperture, the greater the potential required. Thus, an aperture having a diameter of 1 mil may require approximately a 50 volt differential between the continuous and segmented conducting layers while a 10 mil diameter hole may require approximately 300 volts difference for establishing satisfactory fringing blocking and enhancing fields. In each of these examples, an overall applied electrical field for propelling the charged particles through the modulator of approximately for example 5,000 volts per inch is contemplated. When using ink particles directly, whether dry or liquid, a particle size of approximately ⅛ the aperture diameter is desirable but satisfactory results are achieved over a wide range of particle size.

The electrostatic line printing system utilizing the particle modulator illustrated in FIGS. 1 and 2 is set forth diagrammatically in FIG. 3. According to this system, an elongate toner supply 20 provides charged toner particles according to well known techniques, and an overall electrical field is applied between the toner supply 20 and a back electrode 21, having a polarity suitable for projecting charged toner particles in the direction of the electrode 21. Interposed in the path of the toner stream is a particle modulator 10 as described above with reference to FIGS. 1 and 2. A plurality of lead wires 22 in number equal to the number of segments in the segmented conductive layer 14 are connected respectively to each of the segments 14 of the segmented conductive layer. A single lead wire 23 is connected to the continuous conductive layer 12 for applying a fixed potential such as, for example, a ground potential to the conductive layer 12. The plurality of leads 22 are connected to the addressing source which may be, for example, logic switching circuitry for providing computer readout or computer graphic print-out.

The elongate toner supply 20 has a length commensurate with the length of the particle modulator and the lines to be printed. Charged particles emitting from the slit opening 24 in the toner supply 20 are accelerated in the direction of electrode 21. The linear stream of particles is density modulated upon passage through the row of holes 15 formed in the particle modulator and the density modulated stream thereafter continues in the direction of electrode 21. Interposed in the path of the modulated stream of particles is a print-receiving medium 25 which is translated by apparatus not shown relative to the particle modulator in a longitudinal direction. Alternatively, the particle modulator can be translated relative to the print-receiving medium. Selected electrical potentials are applied to the segments 14 along the row of apertures in the particle modulator by means of the lead wires 22 at the rate correlated with the speed of relative translation of print medium 25 so that density modulated linear arrays of toner particles are applied continuously or sequentially to the print-receiving medium according to the lines to be printed. The toner particles which impinge and rest upon the print medium 25 are thereafter fixed as, for example, by heating according to well-known techniques.

Addressing of the apertures 15 of the particle modulator by means of the lead wire 22 can be accomplished by direct parallel connection to a "line at a time" output device, or sequential addressing may be accomplished by attaching each lead wire to a tapped delay line, thus permitting a single source continuous input that produces a television-like image as the receiving substrate or print medium 25 is translated relative to the particle modulator. Alternatively, a ring or sleeve (with lead affixed) may bound a portion of each aperture internally or externally to comprise the segments, thereby permitting even closer spacing of apertures. Further, the apertures may comprise ring capped insulative sleeves spaced in proximity in or on a conductive plate, mesh or matrix because it is the sandwiched insulator construction which enables the double layer charge to be established in selected magnitudes and polarities, in turn to produce the fringing fields.

Instead of directly modulating a stream of inked particles, whether dry or liquid, the particle modulator can be utilized to modulate a stream of ions for impingement on a dielectric print-receiving medium or a substrate having an insulative layer capable of supporting an electrostatic latent image. As shown in FIGS. 4A and 4B, a row of corona discharge points 30 is aligned with the particle modulator so that each corona discharge point 30 is aligned with an aperture 15 of the particle modulator 10. An overall applied field between the corona discharge point 30 and electrode 31 generates an ion stream in the direction of electrode 31 which is modulated according to the potentials applied to the segments of the segmented conductive layer of the particle modulator as heretofore described. The modulated ion stream continues in the direction of electrode 31 and impinges upon a printing medium or substrate 32 translated relative to the particle stream. The print medium or substrate 32 must be a dielectric material or include a dielectric layer upon which the ions may impinge to establish an electrostatic latent image. The line-by-line electrostatic latent images established on a print medium 32 are thereafter developed by dusting or other known techniques and fixed. The electrostatic line printer system illustrated in FIGS. 5A and 5B is similar except that a corona discharge wire 35 is substituted for the row of corona points 30. Advantages of the use of ions as the image-forming particles are that it affords simplicity of construction and eliminates the problem of toner accumulation on the particle modulator. Other aspects of electrostatic printing by means of modulating an ion stream are set forth in U.S. Pat. application Ser. Nos. 709,578 and 709,660, both assigned to the assignee of the present case.

For printing on non-dielectric materials, for printing on irregular surfaces, and for multiple overprinting without intermediate fixing and drying, direct marking toners such as dry powder toners or aerosols are used.

The multilayered apertured particle modulator is addressed optically by the arrangement illustrated in FIG. 6. According to this arrangement, each of the conductive segments 14 of the segmented conductive layer of particle modulator 10 is connected by an electrical lead through a photoconductor cell 40 to a ground potential 41 or other fixed potential as hereinafter described. At the same time, and electrical power supply is connected by way of lead 42 through resistances 43 to each of the segments 14 of the segmented conductive layer.

The photoconductor cells 40 can be addressed by sweeping an image continuously across the row of photoconductor cells or sweeping an image line-by-line across the row of photoconductor cells. Sequential scanning by a single modulated light source along the row of photoconductors can also be used. In any of these examples the image or light source can be swept relative to the modulator, or the modulator can be moved relative to the image or light source. As another example, fiber optic tubes can be used to individually address each photoconductor cell 40. The electrical potential applied to a particular segment is thus a function of and proportional to the light falling on the photoconductor associated with the segment. Other arrangements optically responsive for applying selected potentials to the segments can also be used.

In order to provide within the apertures 15 of the particle modulator 10, fringing enhancing fields for accelerating and broadening the stream of particles passing through the apertures in addition to fringing blocking fields for preventing the passage of particles therethrough, fields of opposite direction and polarity must be established within the apertures. In order to accomplish this in the electrostatic line printing system illustrated in FIG. 3, the continuous conductive layer 12 can be maintained at ground potential while electrical potentials varying from negative to positive are applied to the lead wires 22 depending upon whether blocking or enhancing fields are required. In addition, the continuous conductive layer 12 can be maintained at a fixed potential other than a zero potential and the electrical potential supplied by lead wires 22 to the conductive segments of the segmented conductive layer varied on either side of the potential at the conductive layer 12. In order to provide both blocking and enhancing fields for the optically addressable particle modulator illustrated in FIG. 6, the lead wire 41 from the photoconductor cells 40 is connected to an electrical potential of polarity opposite the voltage source applied to lead 42. As another example the potential applied to the continuous conductive layer can be adjusted. By this expedient, both the direction of polarity and the strength of the field can be varied according to the light falling upon the photoconductor elements 40. Reversal of polarity and field direction with the apertures permits switching from positive to negative printing and vice versa.

In order to provide closer spacing of the apertures of the particle modulator for accomplishing better control of full marking coverage, a pair of rows of apertures can be provided in the multilayered particle modulator, offset with respect to each other as illustrated in FIG. 7. A fragmentary portion of a particle modulator 50 is shown therein consisting of a layer of insulating material and a continuous conductive layer coated on one side thereof as heretofore described. On the opposite side of the insulator layer from the continuous conductive layer, two rows of conductive segments 51 and 52 are provided forming a segmented conductive layer. The two rows of segments 51 and 52 correspond to two rows of apertures 53 and 54 formed through the multilayered particle modulator. Each of these segments 51 and 52 is insulatively isolated from every other segment. Furthermore, each of the segments 51 is formed around an aperture 53 while each of the segments 52 is formed around an aperture 54. The rows of apertures 53 and 54 are formed 180° out of phase so that the edges of one hole 53 coincide with or overlaps the edges of the nearest holes 54. By means of the offset rows of apertures 53 and 54, complete coverage of the area behind the particle modulator and control of printing on the printing medium or substrate translating relative to the particle modulator is provided.

The multilayered particle modulator contemplated by the present invention can be embodied in forms other than the examples set forth above. Thus, the conductive layers on either side of the insulating layer can both be segmented with selected potentials as a function of material to be printed applied to the segments of the segmented layer on one side and generally fixed potentials applied to the segmented layer on the other side. And, each segment need not be necessarily surround an aperture but can partially surround an aperture or be formed in separate parts which abut against opposite edges of an aperture.

As another example, illustrated in FIG. 8, instead of a row of apertures, an elongate opening or slot 60 can be formed through the multilayered particle modulator 61 for passage of particles therethrough. At least one of the conductive layers on one side of the modulator is segmented with parts of each segment 62 abutting against opposite edges of the slot in rows along the slot for establishing a plurality of separately controllable electrical fields within the slot. As in the previous examples, a generally fixed potential is applied to the conductive layer on the other side of the particle modulator while selected potentials as a function of an image to be reproduced are applied to the rows of conductive segments 62 along the slot. By this construction, a row or linear array of separately controllable electrical fields can be established within the slot for modulating a linear stream of charged particles passing through the elongate opening. The conductive layer on both sides of the particle modulator can be segmented in rows along the slot, or one layer can be segmented and the other continuous.

FIG. 9 shows a particle modulator 70 formed of a layer 71 of insulative material and a layer 72 of conductive material such as a metal layer formed on one side thereof. A row of holes 73 is formed through the layers 71 and 72 by, for example, drilling. Within each hole 73 is fitted in insulating sleeve 74 which extends through the hole with a rim 75 of metal or other conductive material retained at one end of the sleeve 74 against the insulative layer 71 of the particle modulator. An electrical lead 76 is connected to each conductive rim or ring 75. Selective potentials can be applied to each of the rims 75 along the row of holes 73 in the particle modulator while a ground or common potential is applied to the metal layer 72 for selectively modulating a stream of toner particles passing through the row of holes 73. Positive and negative printing can be accomplished by varying the potentials applied to each of the metal rims 75 from plus to minus with reference to the common potential applied to metal layer 70.

In the modulator shown in FIG. 9A, each insulating sleeve 74 with the rim 75 of metal or other conductive material affixed at one end is attached at its other end to a metal plate 77 having a row of holes 78 formed therethrough. Each insulative sleeve 74 is affixed over a hole 78 to form an aperture through which toner passes. A stream of toner particles is modulated by the application of selected potentials at lead wires 76 attached to the conductive rims or rings 75 while a common or ground potential is applied to the metal plate 77.

The embodiment of the invention illustrated in FIG. 10 is similar to that shown in FIG. 6 providing a particle modulator 80 having an insulative layer 81 with a row of holes 82 formed therethrough. On one side of insulative layer 81 each of the holes 82 is surrounded by a conductive segment 83 insulatively isolated from each of the other segments 83, and each of the segments 83 is connected to a photoconductive element 84. In the modulator 80 of FIG. 10, however, each of the segments 83 is connected through a photoconductive element 84 to a voltage supply line 85. Each of the photoconductive elements 84 functions as a resistance in series with the voltage source to thereby supply a selected potential to each of the segments as a function of the light falling on the respective photoconductive elements 84. A common or ground potential is applied to a layer of metal or other conductive material on the opposite side of the insulative layer 81.

Another optically controlled particle modulator 90, which permits positive to negative printing is illustrated in FIG. 11. As in the previous examples, the modulator 90 consists of an insulative layer 91 having formed therethrough a row of holes 92, each hole surrounded on one side of the insulative layer 91 with a segment 93 of metal or other conductive material insulatively isolated from every other segment 93. In this embodiment, however, each of the segments 93 is connected through a first photoconductive element 94 to a first voltage supply line 95 and a second photoconductive element 96 to a second voltage supply line 97. The photoconductive elements 94 and 96 connected to each segment 93 are optically isolated from each other by light baffles 98. The opposite side of insulative layer 91 is coated with a layer of metal or other conductive material to which is applied a common or ground potential. Voltage supply line 95 can be connected to a voltage source which is, for example, positive with respect to the common potential, while voltage supply line 97 can be connected to a voltage source which is negative relative to the common potential applied to the metal layer on the opposite side of the insulative layer 91. A blocking field or an enhancing field can be established within each of the apertures 92 depending upon whether light is incident upon photoconductive element 94 or 96 corresponding to each respective segment 93. Thus, both strength and polarity of the fields established within apertures 92 are optically controllable.

As used herein and in the following claims the phrase "formed around" with reference to the conductive layers is intended to include the configurations of surrounding, partially surrounding, and abutting against portions of the edge of the aperture or other opening in the particle modulator. Furthermore, the phrases "relative translation" and "translating . . . relative to" is intended to include both translation of the print receiving medium relative to the particle modulator and vice versa.

What is claimed is:
1. An electrostatic printing process comprising the steps of:
projecting electrically charged particles to flow along a path by means of an overall electrical projection field established between the source of charged particles and a particle accelerating electrode;
establishing an array of individual short range electrical fields in the path of the projected particles;
selectively controlling individual short range electrical fields in the array by means of a transmitted pattern of individual selected electrical signals corresponding to a pattern to be reproduced, the short range fields being controllable to cause blocking or permit passing of the projected particles through the array; and
employing the projected particles emerging from the array to print a pattern on a print receiving medium which corresponds to the pattern of selected electrical signals.

2. An electrostatic printing process comprising the steps of:
selectively applying electric potentials in accordance with a pattern to be reproduced between the segments of a segmented layer of conductive material on one side of the insulative layer and the first layer of conductive material on the other side in a multi-layered particle flow modulator having a layer of insulating material, a first layer of conductive material on one side of the insulative layer and a segmented second layer of conductive material coated on the other side of the insulative layer, each segment of the segmented conductive layer being isolated from each other segment, the multilayered modulator having at least one row of apertures therethrough, a segment of the segmented conductive layer being disposed around each aperture;
establishing a projection field from one side of the modulator to the other for projecting electrically charged particles through the particle modulator apertures;
projecting electrically charged particles through the apertures with said projection field whereby the flow of particles therethrough is modulated according to the potentials applied between the segments of the segmented conductive layer and the first layer of conductive material;
positioning a print-receiving medium to intercept the modulated flow of particles; and
providing relative translation between the print-receiving medium and the particle modulator.

3. An electrostatic printing process as set forth in claim 2 wherein the electric potentials are selectively applied to the segments by connecting a plurality of leads respectively between the segments and a plurality of photoconductor cells.

4. An electrostatic printing process as set forth in claim 2 wherein the electrical potentials are selectively applied to the segments by conditioning each segment for continuous response to quanta of light incident upon a photoconductive cell.

5. A process as set forth in claim 2 wherein the electrically charged particles are ions.

6. An electrostatic line printing process comprising the steps of:
applying selected electric potentials individually between each of the segments of the segmented layer of conductive material and the continuous layer of conductive material in a multilayered particle flow modulator having a layer of insulating material, a continuous layer of conductive material coated on one side of the insulative layer and a segmented layer of conductive material coated on the other side of the insulative layer, each segment of the segmented conductive layer being insulatively isolated from each other segment, the multilayered modulator having at least one row of apertures formed therethrough, a segment of the segmented conductive layer being formed around a portion of each aperture to establish a plurality of potential differences of selected magnitude and orientation in the apertures of the particle modulator between the segments of the segmented layer and the continuous layer;

projecting charged particles through the particle modulator apertures to modulate the density of the particle stream according to the pattern of potentials applied to the segments of the segmented conductive layer; and positioning a print-receiving medium in the modulated particle stream.

7. A process as set forth in claim 6 wherein the electrically charged particles are ions.

8. An electrostatic line printing process comprising the steps of:

applying selected potentials individually to each of the segments of the segmented second conductive layer on the one side of a multilayered particle flow modulator having a layer of insulating material, a first layer of conducting material coated on one side of the insulating layer, the layers having at least one row of apertures formed therethrough, and a segmented second layer of conducting material coated on the other side of the insulating layer, each segment of the second conductive layer formed around an aperture through the modulator, each segment being non-contiguous with any other segment;

establishing a substantially fixed potential at the first layer of conductive material on the other side of the particle modulator to establish electric fields of selected magnitude and orientation within the apertures between the segments of the segmented layer and the first conductive layer;

projecting charged particles through selected apertures of the particle modulator according to the pattern of potential differences between the segments of the segmented conductive layer and the first conductive layer;

positioning a print-receiving medium in the particle stream passing through the particle modulator; and translating the print-receiving medium relative to the particle modulator.

9. An electrostatic line printing process as set forth in claim 8 wherein the selected potentials are applied individually to each of the segments of the segmented second conductive layer from a plurality of photoconductor elements, one corresponding to each segment, through a plurality of electrical lead means connecting each segment through a photoconductor element to ground potential.

10. An electrostatic line printing process as set forth in claim 8 wherein the selected potentials applied individually to each of the segments of the segmented second conductive layer are applied through a plurality of electrical leads connected respectively to the segments for applying individually selected potentials is thereto and is including the further step of applying a fixed potential to the first layer of conducting material.

11. An electrostatic line printing process as set forth in claim 10 wherein each of the segments of the second conductive layer is connected through a separate photoconductor cell to ground potential, and wherein each of the plurality of lead wires is connected to electrical power supply means.

12. An electrostatic line printing process as set forth in claim 8 wherein the step of projecting charged particles through the particle modulator is accomplished by establishing an electrical field between a particle source forming a first electrode on one side of the particle modulator, and a second electrode in circuit therewith via a power source and at a polarity opposite the first electrode on the other side of and spaced from the particle modulator.

13. In an electrostatic line printing process the improvement comprising the steps of:

applying electric potentials between each of the segments of the segmented layer of conductive material on the one side of the modulator and the layer of conductive material on the other side in a multilayered particle modulator having an insulative layer with at least one opening forming an elongate line for passage of particles therethrough and layer of conductive material coated on each side of the insulative layer along the elongate line, and at least one conductive layer segmented into insulatively isolated segments for establishing a plurality of separately controllable electrical fields within said at least one opening for modulating a stream of charged particles passing through said opening;

modulating the density of a particle stream according to the pattern of potentials applied between the segments of the segmented conductive layer on the one side of the insulative layer and the conductive layer on the other side by projecting charged particles through the particle modulator apertures;

positioning a print receiving medium in the modulated particle stream; and translating the print receiving medium relative to the particle modulator.

14. In an electrostatic line printing process the improvement comprising the steps of:

applying electric potentials between each of the segments of the segmented layer of conductive material on one side of the modulator and the conductive layer on the other side in a multilayered particle modulator having an insulative layer and conductive layers coated on each side of the insulative layer, the modulator provided with an elongate opening forming a line for passage of particles therethrough, at least one of the conductive layers on one side of the modulator segmented with parts of each segment positioned at opposite edges of the elongate opening in rows along the opening for establishing a plurality of separately controllable electrical fields within the opening;

modulating the density of a particle stream according to the pattern of potentials applied between the segments of the segmented conductive layer on the one side of the modulator and the conductive layer on the other side by projecting charged particles through the particle modulator apertures;

positioning a print-receiving medium in the modulated particle stream; and providing relative translation between said print-receiving medium and the particle modulator.

15. In an electrostatic printing process, the steps of:

individually and selectively establishing fringing fields in an array of apertures between spaced apart conductive layers, by providing selected electrical signals to establish selected individually controllable voltage drops between the conductive layer at each aperture such apertures formed in a particle flow modulator and bounded by the spaced apart conductive layers;

modulating a flow of electrically charged particles in accordance with the magnitude and orientation of the fringing fields; and translating the particle modulator and a print receiving medium for receiving the modulated flow of particles.

16. The process of claim 15 wherein the fringing fields are established by optically monitoring an image to be reproduced to produce signals responsive to selected zones of the image and conditioning the apertures to carry fringing fields of varied potentials responsive to the signals.

17. An electrostatic printing process comprising the steps of:

projecting electrically charged particles to flow along a path by means of an overall electrical projection field established between the source of charged particles and a particle accelerating electrode;

establishing two parallel arrays of electrical potentials in the path of the projected particles;

selectively controlling the potentials at a plurality of positions in one of the arrays by means of selected individual electrical signals applied to thos positions corresponding to a pattern to be reproduced to generate an array of selectively controllable electrical fringing fields at a plurality of locations between the arrays of potentials, the polarities and magnitudes of the fringing fields being controllable to cause blocking and permit passing of the projected particles therethrough to modulate the flow of projected particles in accordance with the pattern to be reproduced; and employing the modulated flow of projected particles to develop the pattern to be reproduced on a print receiving medium.

18. An electrostatic printing process as set forth in claim 1 wherein said particles are ions.

19. An electrostatic printing process comprising:

projecting a stream of electrically charged particles from a particle source along a particle path toward a print receiving medium;

translating the print receiving medium across the particle path;

positioning an apertured particle modulator in the particle path, the particle modulator having first and second parallel conductive layers, the first one of the layers having a plurality of electrically insulated conductive segments, applying a fixed potential to the second one of the layers;

selectively electrically addressing individual segments of the first one of the layers in accordance with a pattern to be printed to selectively produce short range electrical fields within the apertures to block the passage of the charged particles through selected apertures and thereby modulate the particle stream in accordance with the pattern to be printed; and developing the pattern to be printed on the print receiving medium.

20. An electrostatic printing process as set forth in claim 19 wherein the charged particles are marking particles and where the step of developing the pattern to be printed includes the step of intercepting the modulated stream or marking particles on the print receiving medium.

21. An electrostatic printing process as set forth in claim 19 wherein the charged particles are ions from a corona source.

22. An electrostatic printing process as set forth in claim 19 wherein the step of selectively electrically addressing is carried out by optically sensing the pattern to be printed with photoconductor cells electrically connected to the segments of the first conductive layer.

* * * * *